(12) United States Patent
Kuwayama et al.

(10) Patent No.: US 9,067,641 B2
(45) Date of Patent: Jun. 30, 2015

(54) BICYCLE FRONT DERAILLEUR WITH A VARIABLE ACTUATION RATIO

(75) Inventors: Kazuya Kuwayama, Sakai (JP); Atsuhiro Emura, Sakai (JP); Kenkichi Inoue, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 367 days.

(21) Appl. No.: 13/252,113

(22) Filed: Oct. 3, 2011

(65) Prior Publication Data
US 2013/0085026 A1    Apr. 4, 2013

(51) Int. Cl.
| | | |
|---|---|---|
| B62M 9/134 | (2010.01) | |
| B62M 9/131 | (2010.01) | |
| B62M 9/1342 | (2010.01) | |

(52) U.S. Cl.
CPC ............... *B62M 9/131* (2013.01); *B62M 9/134* (2013.01); *B62M 9/1342* (2013.01)

(58) Field of Classification Search
USPC ..................................................... 474/80, 82
See application file for complete search history.

(56) References Cited

U.S. PATENT DOCUMENTS

| | | | |
|---|---|---|---|
| 5,620,383 A | | 4/1997 | Patterson et al. |
| 5,649,877 A | * | 7/1997 | Patterson ......................... 474/80 |
| 5,816,966 A | * | 10/1998 | Yang et al. ........................ 474/82 |
| 7,438,658 B2 | * | 10/2008 | Tetsuka et al. ................... 474/82 |
| 7,762,916 B2 | * | 7/2010 | Ichida et al. ...................... 474/82 |
| 2003/0064841 A1 | | 4/2003 | Kawakami |
| 2008/0300076 A1 | * | 12/2008 | Fukushima et al. ............. 474/80 |
| 2012/0295745 A1 | * | 11/2012 | Emura et al. ..................... 474/80 |

FOREIGN PATENT DOCUMENTS

EP            1997725 A2    12/2008

OTHER PUBLICATIONS

European Search Report for EP 12169426.9, the European application that corresponds to this application, dated Dec. 20, 2013.

* cited by examiner

*Primary Examiner* — William E Dondero
*Assistant Examiner* — Mark K Buse
(74) *Attorney, Agent, or Firm* — James A. Deland

(57) ABSTRACT

A front derailleur comprises a base member structured to be attached to a bicycle frame member, a chain guide operatively connected to the base member, and an actuation mechanism coupled to the base member and to the chain guide for moving the chain guide relative to the base member between a first position corresponding to a location for positioning a chain on a first sprocket and a second position corresponding to a location for positioning the chain on a second sprocket. The actuation mechanism is configured so that an actuation ratio of the derailleur when the chain guide is located in the first position is greater than or equal to 1.5 times the actuation ratio when the chain guide is located in the second position.

26 Claims, 10 Drawing Sheets

BICYCLE FRONT DERAILLEUR WITH A VARIABLE ACTUATION RATIO

BACKGROUND OF THE INVENTION

The present invention is directed to bicycle control devices and, more particularly, to a bicycle front derailleur with a variable actuation ratio.

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices used for performing transmission shifting operations.

Typically, front and rear shift control devices mechanically operate corresponding front and rear derailleurs via cables. In either case, an operating force usually is applied by one of the rider's fingers to operate a control lever, and the operating force is transmitted to the actuating mechanism of the bicycle derailleur by a cable that is fixed to the control lever and to the actuating mechanism.

SUMMARY OF THE INVENTION

The present invention is directed to various features of a bicycle derailleur. In one embodiment, a front derailleur comprises a base member structured to be attached to a bicycle frame member, a chain guide operatively connected to the base member, and an actuation mechanism coupled to the base member and to the chain guide for moving the chain guide relative to the base member between a first position corresponding to a location for positioning a chain on a first sprocket and a second position corresponding to a location for positioning the chain on a second sprocket. The actuation mechanism is configured so that an actuation ratio of the derailleur when the chain guide is located in the first position is greater than or equal to 1.5 times the actuation ratio when the chain guide is located in the second position. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
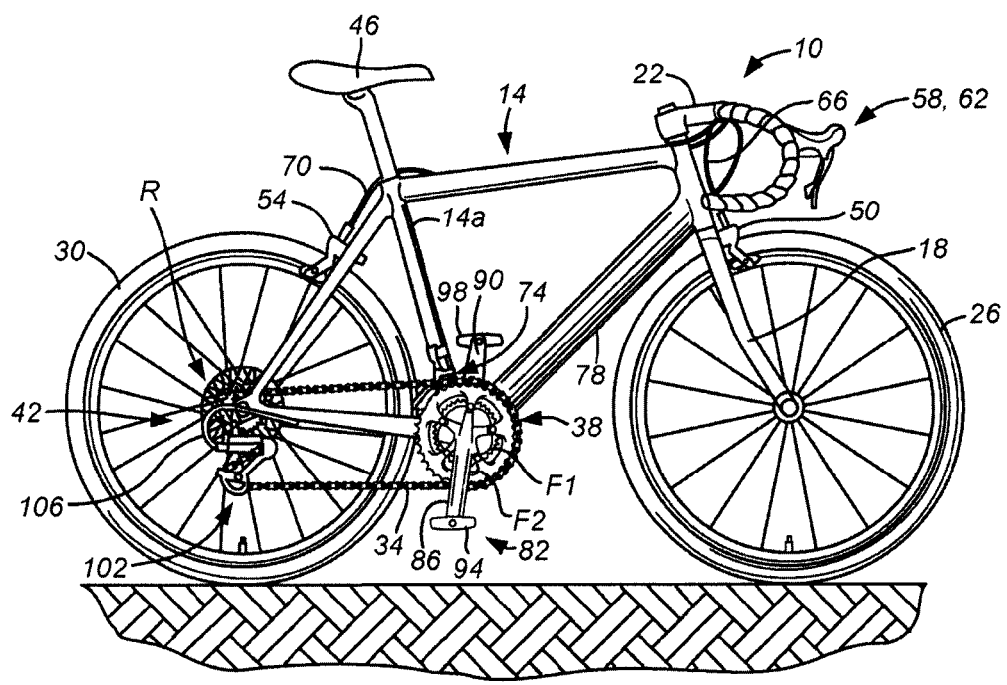
FIG. 1 is a side view of a bicycle that is equipped with particular embodiments of bicycle control devices.

FIG. 1 is a side view of a bicycle 10 that is equipped with particular embodiments of bicycle control devices. In this embodiment, bicycle 10 is a road bicycle comprising a diamond-shaped frame 14, a front fork 18 rotatably mounted to frame 14, a handlebar assembly 22 mounted to the upper part of fork 18, a front wheel 26 rotatably attached to the lower part of fork 18, a rear wheel 30 rotatably attached to the rear of frame 14, a chain 34, a front transmission 38, a rear transmission 42, and a saddle 46. A front wheel brake 50 is provided for braking front wheel 26, and a rear wheel brake 54 is provided for braking rear wheel 30. Well-known combined brake/shift control devices 58 and 62 are provided on both ends of handlebar assembly 22 in a conventional manner. The brake lever portion of brake/shift control device 58 (typically located on the left side of handlebar assembly 22) is connected to front wheel brake 50 through a Bowden cable 66 for braking front wheel 26, and the brake lever portion of brake/shift control device 62 (typically located on the right side of handlebar assembly 22) is connected to rear wheel brake 54 through a Bowden cable 70 for braking rear wheel 30.

Front transmission 38 is a mechanical unit attached to the central lower part or bottom bracket of frame 14 for transmitting drive force generated by the rider to rear transmission 42 via chain 34. Front transmission 38 comprises a first sprocket F1, a second sprocket F2 and a front derailleur 74, wherein front derailleur 74 is coupled to the shift lever portion of brake/shift control device 58 through a Bowden cable 78. Front derailleur 74 selectively switches chain 34 to front sprockets F1 and F2 when the rider pulls and releases a control cable in the form of an inner wire 80 (FIG. 6) of Bowden cable 78. Front sprockets F1 and F2 are installed on a gear crank 82, wherein front sprocket F1 has fewer teeth and a smaller diameter than front sprocket F2. Gear crank 82 comprises a crankshaft (not shown) that passes through frame 14, a right crank arm 86, and a left crank arm 90. One end of right crank arm 86 is connected to the right side of the crankshaft, and sprockets F1 and F2 are attached to right crank arm 86. A pedal 94 is rotatably mounted to the other end of right crank arm 86. One end of left crank arm 90 is connected to the left side of the crankshaft, and a pedal 98 is rotatably mounted to the other end of left crank arm 90.

Rear transmission 42 transmits the driving force transmitted by chain 34 to rear wheel 30. Rear transmission 42 comprises a plurality of rear sprockets R and a rear derailleur 102. Rear sprockets R are mounted concentrically with the hub portion of rear wheel 30. Rear derailleur 102 is coupled to the shift lever portion of brake/shift control device 62 through a Bowden cable 106 so that rear derailleur 102 selectively switches chain 34 among rear sprockets R when the rider pulls and releases an inner wire (not shown) of Bowden cable 106.

Figure 2:
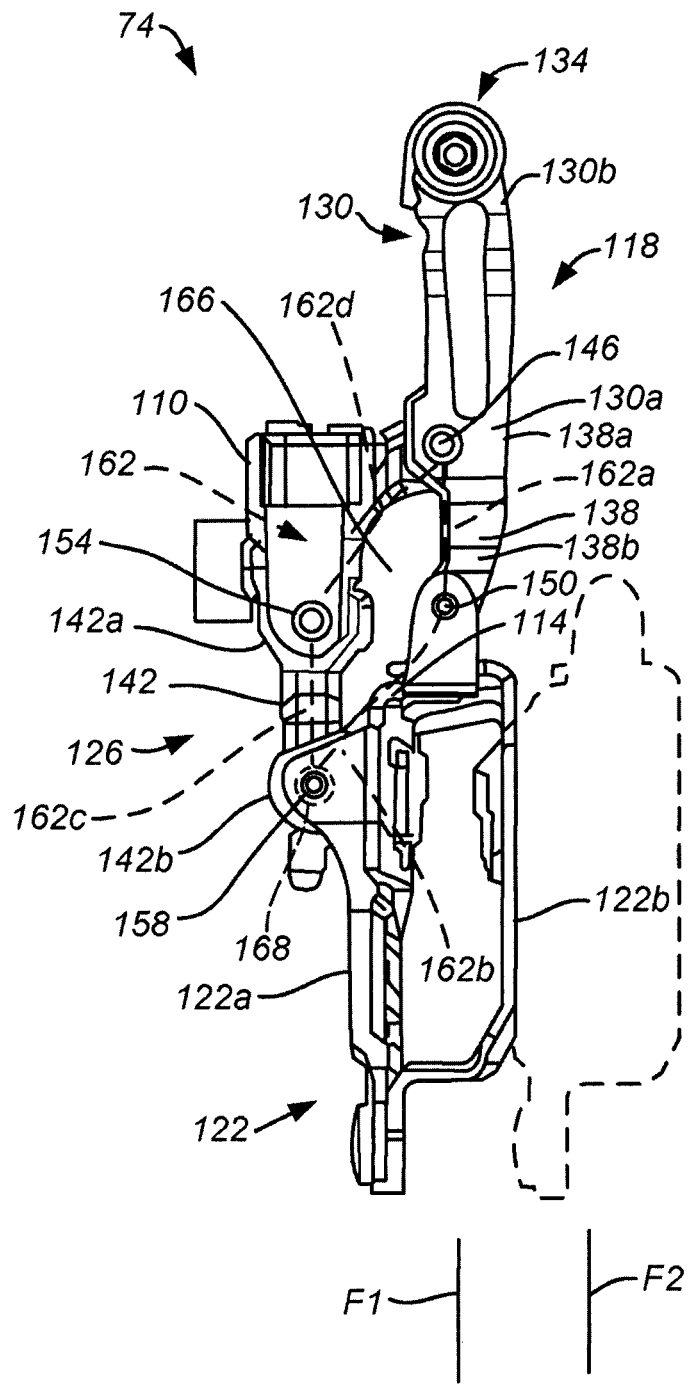
FIG. 2 is a rear view of a particular embodiment of a front derailleur.

FIG. 2 is a rear view of front derailleur 74. Front derailleur 74 comprises a base member 110 structured to be attached to a seat tube 14a of bicycle frame 14, a movable member 114, and an actuation mechanism 118 that controls movement of movable member 114 relative to base member 110. A chain guide 122 is supported by movable member 114 for guiding chain 34 from front sprocket F1 to front sprocket F2 and vice versa, wherein chain guide 122 includes an inner chain guide plate 122a and an outer chain guide plate 122b. In this embodiment, movable member 114 is integrally formed with inner chain guide plate 122a.

In this embodiment, actuation mechanism 118 includes a link mechanism 126, an actuating arm 130 and an control cable route adjuster 134. Link mechanism 126 includes an outer first link 138 and an inner second link 142. A first end portion 138a of first link 138 is pivotably coupled to base member 110 at a first pivot location defined by a first pivot shaft 146, and a second end portion 138b of first link 138 is pivotably coupled to movable member 114 at a second pivot location defined by a second pivot shaft 150, wherein first and second pivot shafts 146 and 150 also define pivot axes of first link 138. Similarly, a first end portion 142a of second link 142 is pivotably coupled to base member 110 at a third pivot location defined by a third pivot shaft 154, and a second end portion 142b of second link 142 is pivotably coupled to movable member 114 at a fourth pivot location defined by a fourth pivot shaft 158, wherein third and fourth pivot shafts 154 and 158 also define pivot axes of second link 142. Base member 110, movable member 114, first link 138 and second link 142 form a parallelogram linkage mechanism wherein a parallelogram 162 may be defined by straight phantom lines 162a, 162b, 162c and 162d.

In this embodiment, actuating arm 130 is a generally straight, elongated member having a first end portion 130a that originates from first end portion 138a of first link 138 such that actuating arm 130 extends in a direction opposite phantom line 162a, wherein phantom line 162a forms a straight path that originates from the first pivot location defined by first pivot shaft 146 and extends to the second pivot location defined by second pivot shaft 150. Preferably, the entire actuating arm 130 is disposed outside of an interior space 166 circumscribed by the parallelogram linkage mechanism when viewed along the pivot axes of first and second links 138 and 142. More preferably, the entire actuating arm 130 is disposed outside of parallelogram 162. Since actuating arm 130 is coupled to first link 138, rotation of actuating arm 130 counterclockwise around first pivot shaft 146 causes first link 138 to rotate counterclockwise around pivot shaft 146. As a result, link mechanism 126 causes chain guide 122 to move laterally outwardly relative to base member 110 so that inner chain guide plate 122a contacts chain 34 and moves from a first position shown in solid lines in FIG. 2 to a second position shown by a broken line in FIG. 2 to position chain 34 on front sprocket F2 in a conventional manner. Conversely, rotation of actuating arm 130 clockwise around first pivot shaft 146 causes first link 138 to rotate clockwise around pivot shaft 146. As a result, link mechanism 126 causes chain guide 122 to move laterally inwardly relative to base member 110 so that outer chain guide plate 122b contacts chain 34 to position chain 34 on front sprocket F1. Chain guide 122 is located closer to base member 110 when chain guide 122 is located in the first position than when chain guide 122 is located in the second position. Chain guide 122 is biased towards the first position by a conventional biasing member in the form of a return spring 168 in the form of a coil spring. In this embodiment, the first position corresponds to an inner end position of chain guide 122, and the second position corresponds to an outer end position of chain guide 122. In other words, chain guide 122 can be moved within a range between the first position and the second position.

Figure 3:
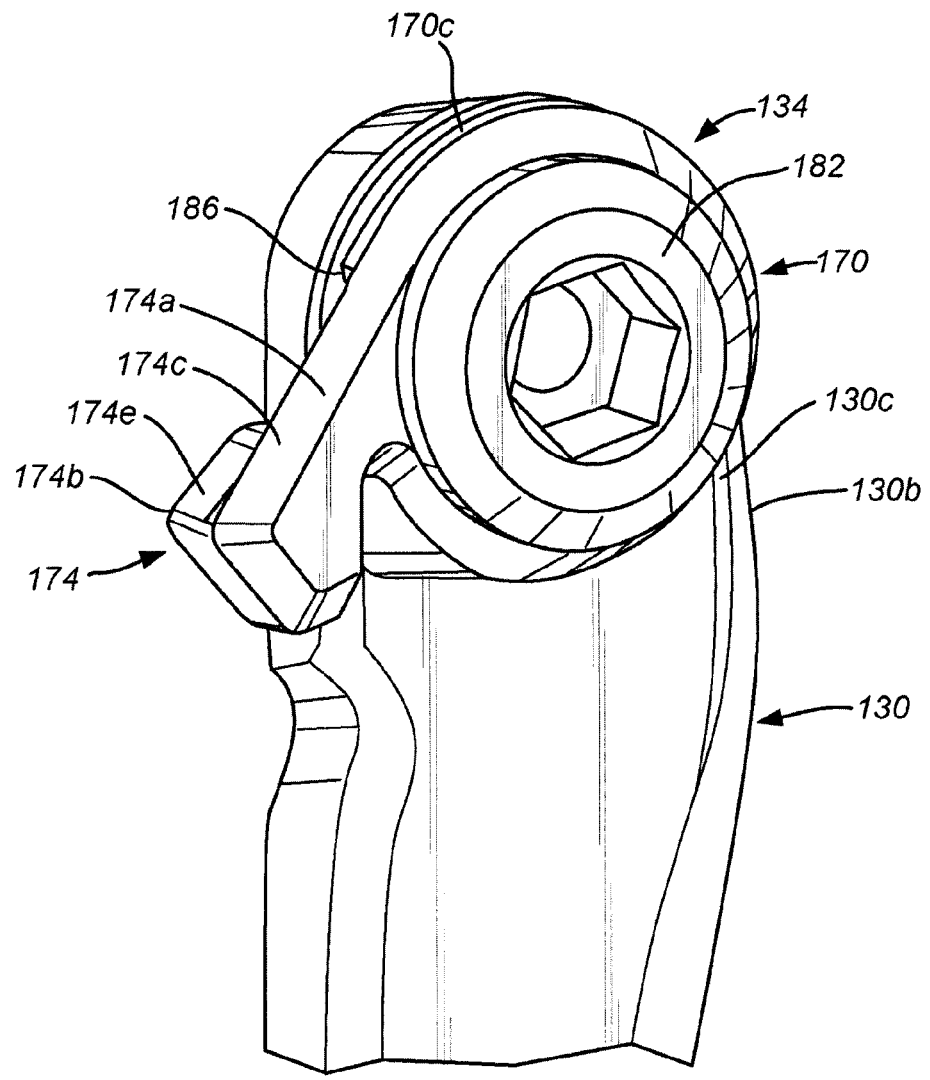
FIG. 3 is detailed view of a control cable route adjuster attached to an actuating arm.
Figure 4:
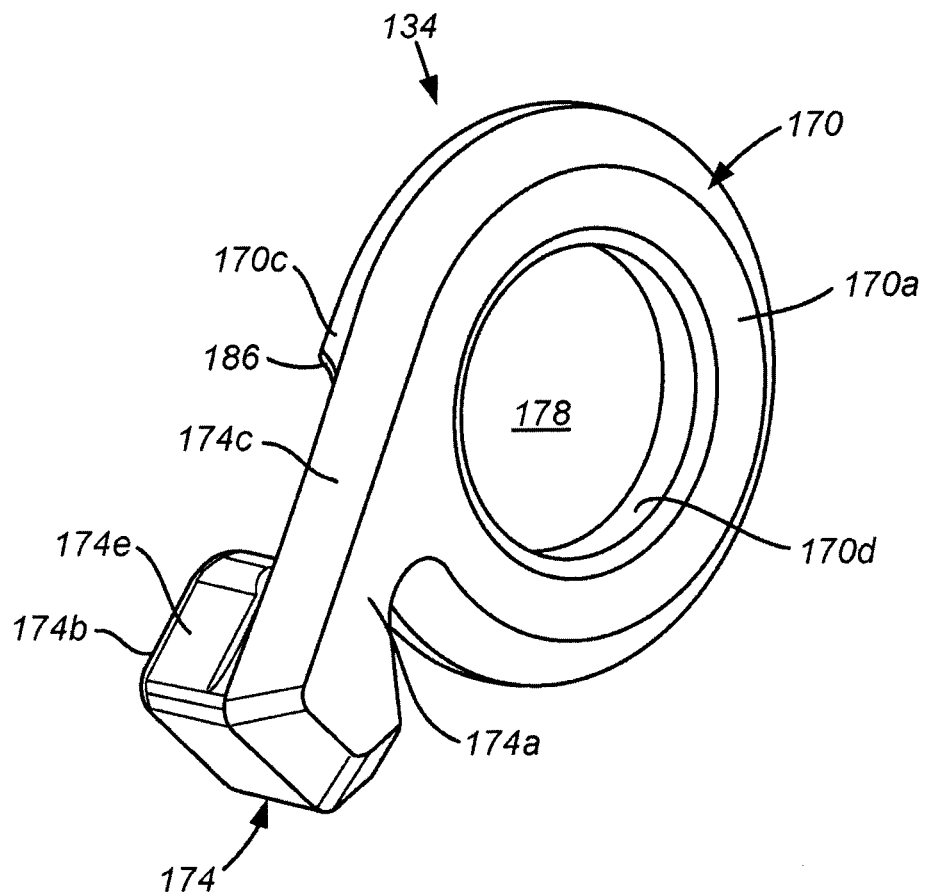
FIG. 4 is a front perspective view of the control cable route adjuster.
Figure 5:
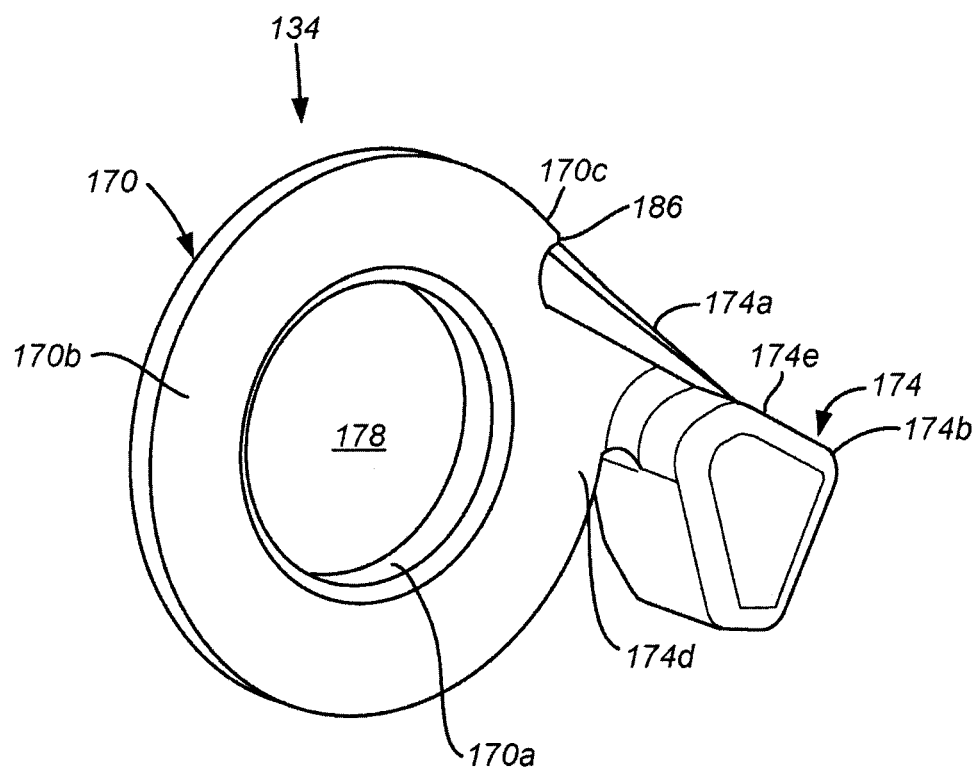
FIG. 5 is a rear perspective view of the control cable route adjuster.

In this embodiment, control cable route adjuster 134 is coupled to a distal second end portion 130b of actuating arm 130. As shown more clearly in FIGS. 3-5, control cable route adjuster 134 comprises a generally annular cable attachment portion 170 and a cable diverting protrusion 174 that extends radially outwardly from cable attachment portion 170. Cable attachment portion 170 and cable diverting protrusion 174 form a continuous one-piece member.

Cable attachment portion 170 is used to for attaching inner wire 80 of Bowden cable 78 to actuating arm 130. In this embodiment, cable attachment portion 170 includes an outer side surface 170a, an inner side surface 170b, an outer peripheral surface 170c and an inner peripheral surface 170d. Inner peripheral surface 170d defines an opening 178 for receiving a fastener in the form of a bolt 182 therethrough. Bolt 182 screws into a threaded opening (not shown) in actuating arm 130 so that inner side surface 170b presses against an outer side surface 130c of actuating arm 130. As a result, inner side surface 170b clamps inner wire 80 to actuating arm 130 as shown in FIG. 6, wherein inner wire 80 exits cable attachment portion 170 at a cable engagement location 186 at outer peripheral surface 170c.

In this embodiment, cable diverting protrusion 174 includes an elongated arm-shaped portion 174a and a cable diverting portion 174b. Arm-shaped portion 174a is oriented generally tangent to opening 178 of cable attachment portion 170 and includes a straight outer surface 174c that is generally tangent to outer peripheral surface 170c of cable attachment portion 170. Cable diverting portion 174b extends laterally inwardly from an inner side surface 174d of arm-shaped portion 174a. A straight outer surface 174e of cable diverting portion 174b is disposed adjacent to outer surface 174c of arm-shaped portion 174a but at a radial incline relative to outer surface 174c. As discussed below, outer surface 174e of cable diverting portion 174b functions as a cable diverting surface for inner wire 80.

Figure 6:
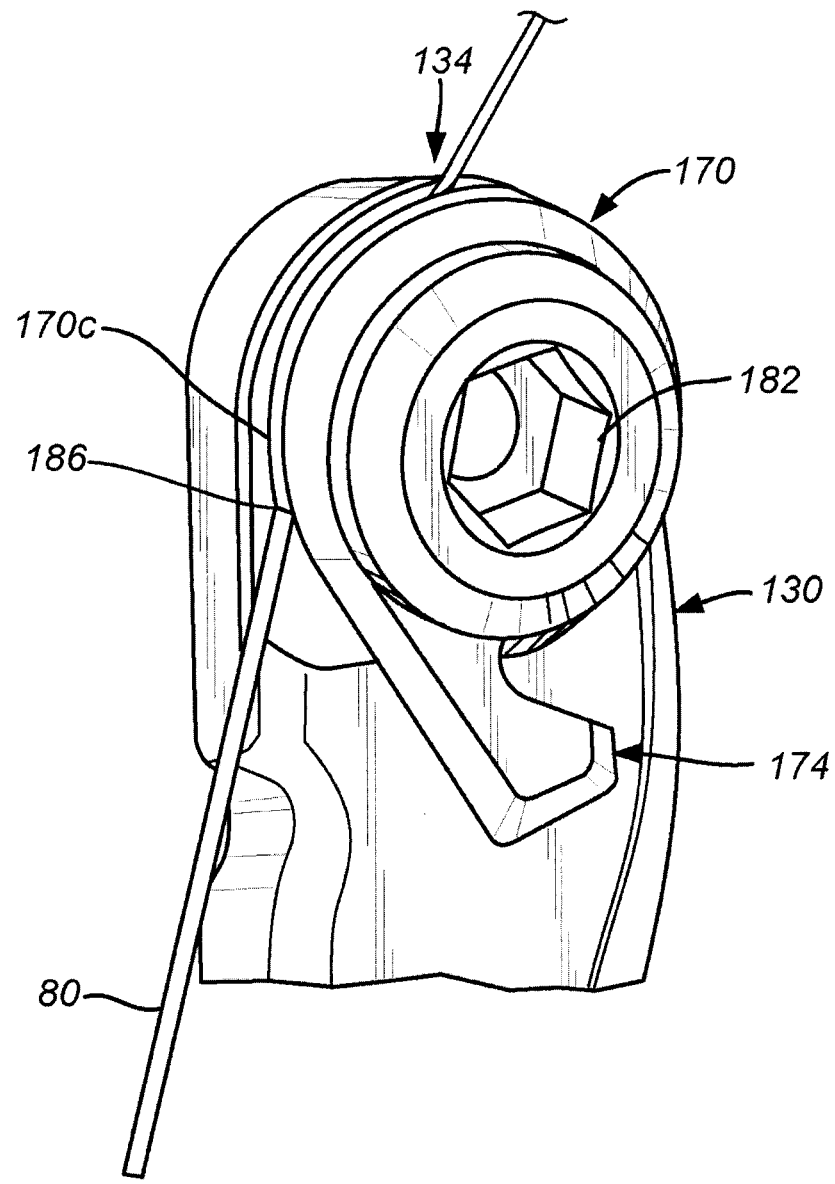
FIG. 6 shows a path of a control cable when the control cable route adjuster is in a rest position.
Figure 7:
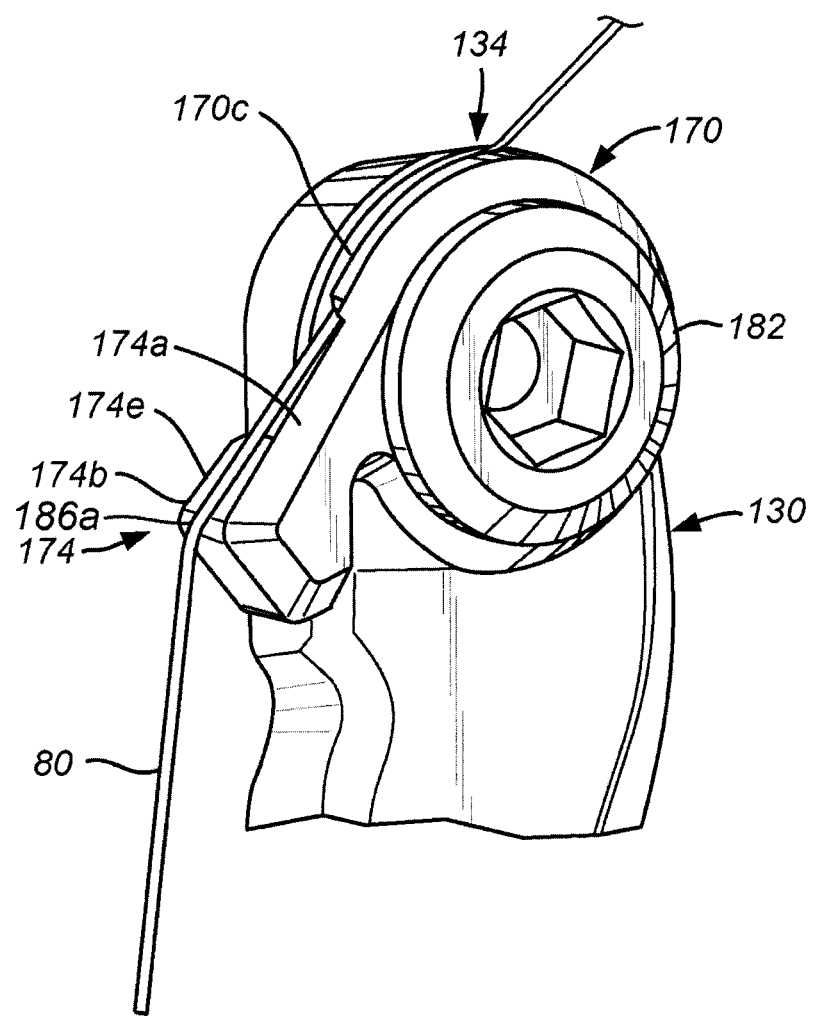
FIG. 7 shows a path of a control cable when the control cable route adjuster is in an adjustment position.

Since control cable route adjuster 134 is mounted to actuating arm 130 through a bolt 182, control cable route adjuster 134 may be rotated relative to actuating arm 130 and first and second links 138 and 142 from a rest position shown in FIG. 6 to an adjustment position shown in FIG. 7. When control cable route adjuster 134 is in the rest position shown in FIG. 6, control cable route adjuster 134 allows inner wire 80 to have a straight path, and cable engagement location 186 is provided at cable attachment portion 170. However, when control cable route adjuster 134 is located in the adjustment position shown in FIG. 7, outer surface 174e of cable diverting portion 174b bends the path of inner wire 80, and a cable engagement location 186a is provided on cable diverting protrusion 174 to vary the actuation ratio of front derailleur 74.

Figure 8:
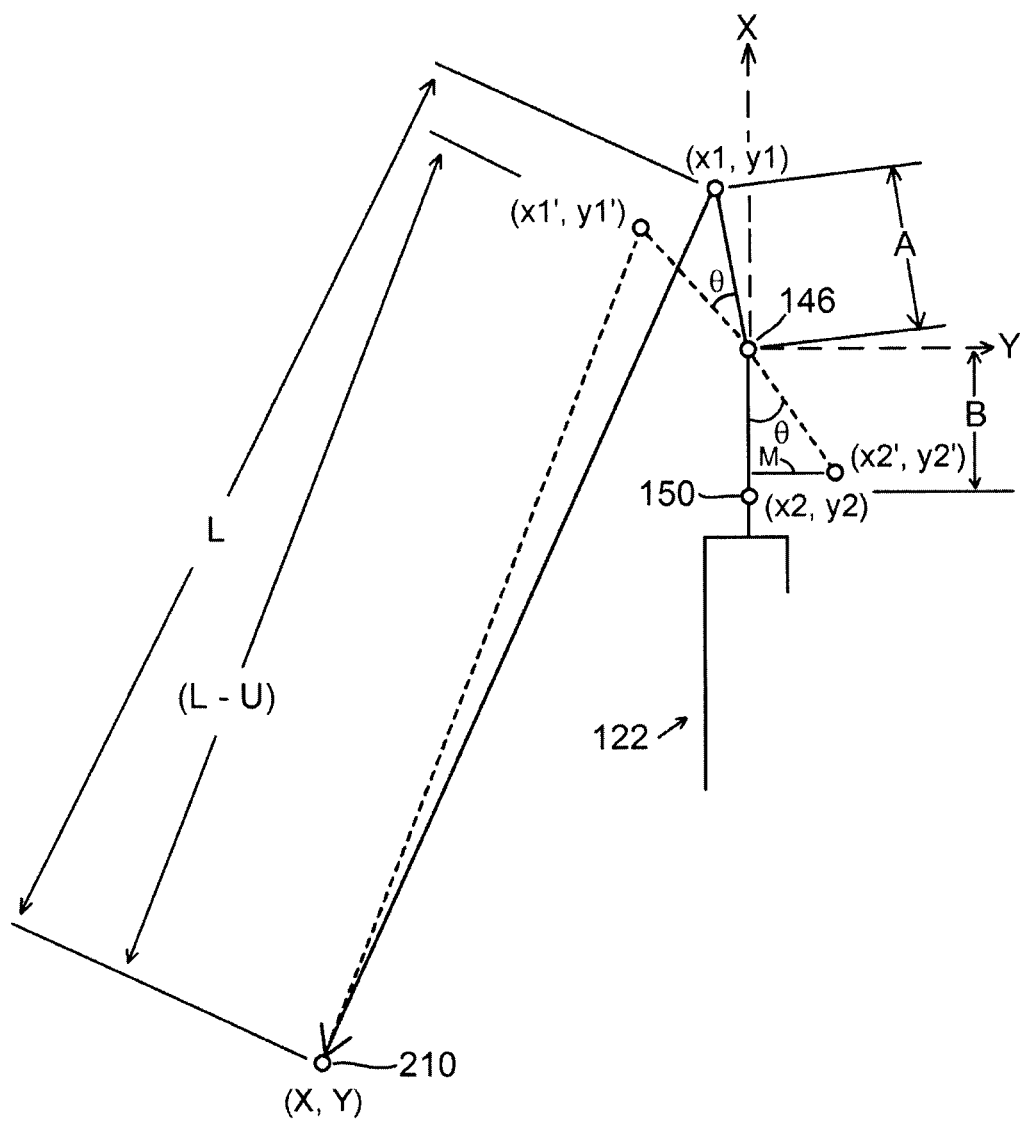
FIG. 8 is a schematic diagram showing one method of calculating actuation ratio when a link between the base member and the chain guide extends along a Y-axis of a Cartesian coordinate system.

FIG. 8 is a schematic diagram showing one method of calculating actuation ratio when first link 138 extends along a Y-axis of a Cartesian coordinate system and pivot shaft 146 is located at the origin of the coordinate system. The actuation ratio is the amount of chain guide movement perpendicular to seat tube 14a or to the planes of front sprockets F1 and F2 per unit displacement of inner wire 80. Let A be the distance between cable engagement location 186 or 186a and pivot shaft 146; let B be the distance between pivot shaft 146 and pivot shaft 150; let (X,Y) be the coordinates where inner wire 80 begins the straight path to control cable route adjuster 134 (e.g., as inner wire 80 exits the frame or exits from the outer casing of the Bowden cable, represented by exit 210); let (X1,Y1) be the coordinates of cable engagement location 186 or 186a prior to pulling inner wire 80; let L be the length of inner wire from exit 210 to coordinates (X1,Y1); let (X1',Y1') be the coordinates of cable engagement location 186 or 186a after pulling inner wire 80 by a length U; let L' be the length of inner wire from exit 210 to coordinates (X1',Y1') (L'=L−U); let (X2,Y2) be the coordinates of pivot shaft 150 prior to pulling inner wire 80 (X2=0 in this example); let (X2',Y2') be the coordinates of pivot shaft 150 after pulling inner wire 80, and let M be the amount of movement of pivot shaft 150, and hence chain guide 122, perpendicular to seat tube 14a or to the planes of front sprockets F1 and F2 as appropriate.

When inner wire 80 is pulled by length U, cable engagement location 186 or 186a, as appropriate, moves from (X1, Y1) to (X1',Y1'), and pivot shaft 150 moves from (X2,Y2) to (X2',Y2'), thereby causing actuating arm 130 and first link 138 to rotate by an angle θ. In order to determine the value of θ, one may measure a least one of X1' or Y1'. Assume X1' is measured. Then, $L'^2 = (X-X1')^2 + (Y-Y1')^2$. Since $X1'^2 + Y1'^2 = A^2$, and since X1' and A are known, Y1' may be determined, and θ may be determined by the relationship between (X1, Y1) and (X1', Y1') relative to the origin (0, 0) at pivot shaft 146. Then, since B is known, M=B·sinθ, and the actuation ration is M/U.

Figure 9:
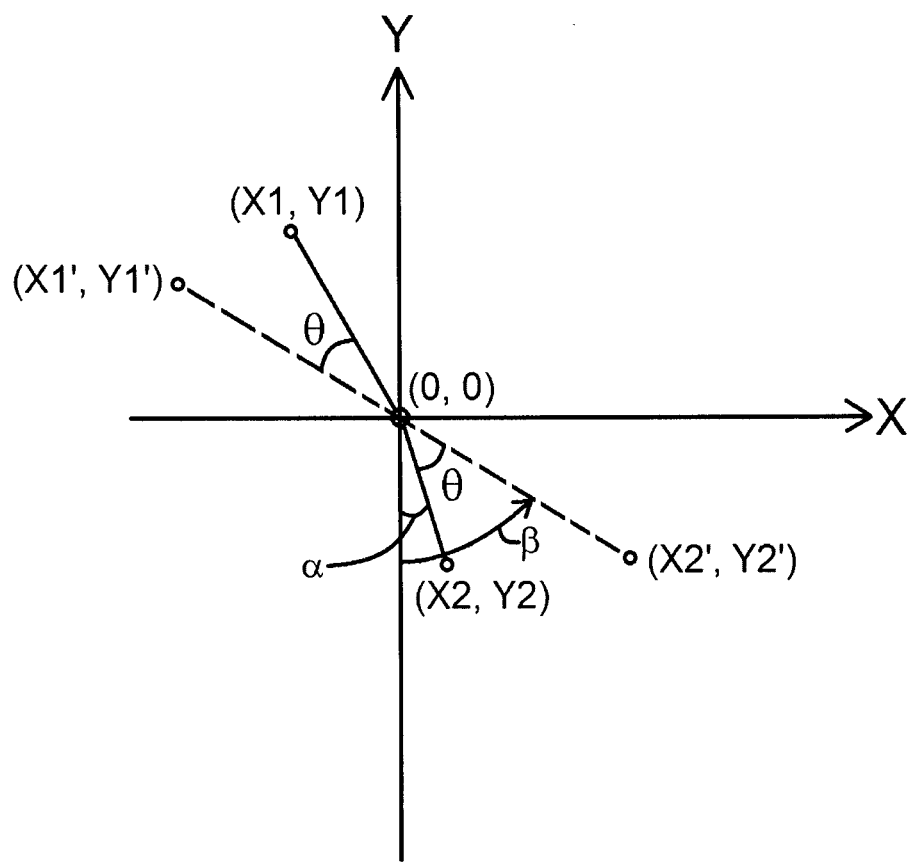
FIG. 9 is a schematic diagram showing another method of calculating actuation ratio when a link between the base member and the chain guide does not extend along the Y-axis of the Cartesian coordinate system.
Figure 10:
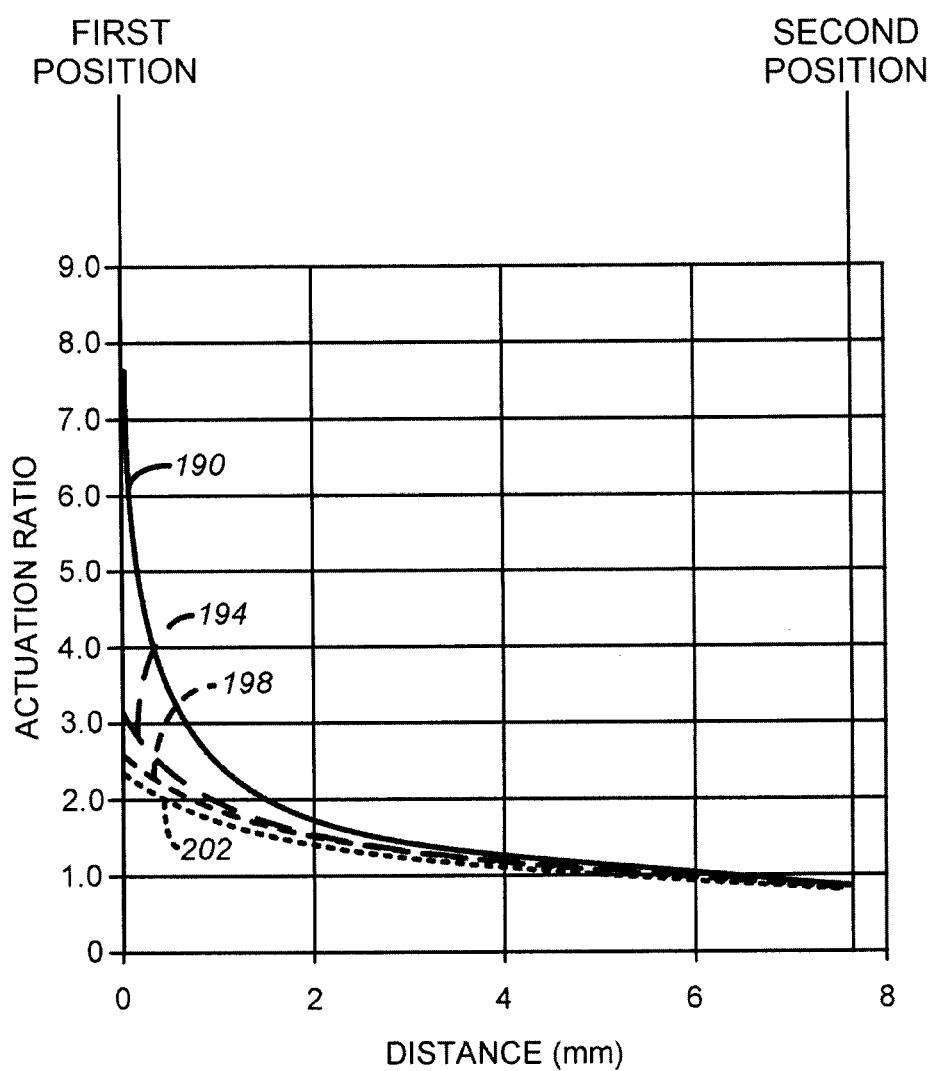
FIG. 10 is a graph of actuation ratio as a function of chain guide position when the front derailleur is attached to the bicycle in different mounting positions;.

FIG. 9 is a schematic diagram showing the more general method of calculating actuation ratio when first link 138 does not extend along the Y-axis of the Cartesian coordinate system. In this case, M=B·sinβ−B·sinα=B·sin(θ+α)−B·sinα, wherein $\alpha = \cos^{-1}(A/B)$;

FIG. 10 is a graph of actuation ratio as a function of chain guide position when front derailleur 74 is attached to seat tube 14a in different mounting positions. Curve 190 shows a variable actuation ratio when front derailleur 74 is mounted on the right-most side of seat tube 14a and control cable route adjuster 134 is located in the rest position. In this case, the actuation ratio varies smoothly in a mathematically nonlinear arc from approximately 7.63 when chain guide 122 is located in the first position to approximately 0.85 when chain guide 122 is located in the second position. Curve 194 shows a variable actuation ratio when front derailleur 74 is mounted on a gauge frame seat tube 14a and control cable route adjuster 134 is located in the rest position. In this case, the actuation ratio varies smoothly in a mathematically nonlinear arc from approximately 3.14 when chain guide 122 is located in the first position to approximately 0.81 when chain guide 122 is located in the second position. Curve 198 shows a variable actuation ratio when front derailleur 74 is mounted on the right-most side of seat tube 14a and control cable route adjuster 134 is located in the adjustment position. In this case, the actuation ratio varies smoothly in a mathematically nonlinear arc from approximately 2.61 when chain guide 122 is located in the first position to approximately 0.81 when chain guide 122 is located in the second position. Curve 202 shows a variable actuation ratio when front derailleur 74 is mounted on a gauge frame seat tube 14a and control cable route adjuster 134 is located in the adjustment position. In this case, the actuation ratio varies smoothly in a mathematically nonlinear arc from approximately 2.37 when chain guide 122 is located in the first position to approximately 0.78 when chain guide 122 is located in the second position.

Unlike derailleurs with fixed or erratic actuation ratios, a front derailleur 74 constructed as taught herein may be used with different types of frames and return springs to suit the application. For example, front derailleur 74 could be mounted to the right-most side of seat tube 14a with control cable route adjuster 134 located in the rest position (curve 190) when return spring 168 rapidly increases the biasing force as chain guide 122 moves from the first position to the second position. In this case, the high initial actuation ratio evens out the perceived force required to pull inner wire 80 while also reducing the overall amount of rotation of the shift control lever. Curves 194, 198 and 202 represent front derailleurs wherein return spring 168 provides a more even increase in biasing force as chain guide 122 moves from the first position to the second position. In those cases, control cable route adjuster 134 may be used as desired to achieve the desired more even effort to pull inner wire 80.

A particularly unexpected benefit is the ability to decrease the amount of effort required to rotate the shift control device when the rider's hand may be in an awkward position. For example, shift control devices such as shift lever portion of brake/shift control device 58 typically are mounted for easy initial operation of the shift lever. However, as the rider pushes the shift lever portion of brake/shift control device 58, the rider must pivot his/her wrist more and more from an ergonomic position to a more awkward position in order to move the shift lever further as chain guide 122 moves from the first position to the second position. The configuration of actuating arm 130 as well as the provision of control cable route adjuster 134 taught herein allows front derailleur 74 to be configured so that the actuation ratio is larger when the rider's hand is positioned ergonomically, but the actuation ratio is smaller, thereby decreasing the effort required to rotate the shift lever, when the rider's hand is oriented in an awkward position. In this embodiment, curves 190, 194, 198 and 202 preferably, but not necessarily, never increase and always decrease to provide a smooth operating feeling. Preferably, but not necessarily, the actuation ratio of front derailleur 74 when chain guide 122 is located in the first position is greater than 1.5 times the actuation ratio when chain guide 122 is located in the second position. Preferably, but not necessarily, the actuation ratio is greater than 1.5 and less than 3.5 when chain guide 122 is located in the first position, and the actuation ratio is less than 1.0 when chain guide 122 is located in the second position.

While the above is a description of various embodiments of inventive features, further modifications may be employed without departing from the spirit and scope of the present invention. For example, actuating arm 130 need not be straight and need not extend directly opposite phantom line 162a of parallelogram 162. The entire actuating arm 130 need not be disposed outside of interior space 166 or parallelogram 162. Cable attachment portion 170 and cable diverting protrusion 174 need not form a continuous one-piece member. Cable diverting protrusion 174 may be a separate member attached to cable attachment portion 170, and cable diverting portion 174b may be a separate member attached to arm-shaped portion 174a. Outer surface 174e of cable diverting portion 174b may be aligned with outer surface 174c of arm-shaped portion 174a.

The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A front derailleur comprising:
   a base member structured to be attached to a bicycle frame member;
   a chain guide operatively connected to the base member; and
   an actuation mechanism coupled to the base member and to the chain guide for moving the chain guide relative to the base member between a first position corresponding to a location for positioning a chain on a first sprocket and a second position corresponding to a location for positioning the chain on a second sprocket;
   wherein the actuation mechanism is configured so that an actuation ratio of the derailleur when the chain guide is located in the first position is greater than or equal to 1.5 times the actuation ratio when the chain guide is located in the second position so that the force required to operate the derailleur when the chain guide is located in the first position is greater than the force required to operate the derailleur when the chain guide is located in the second position;
   wherein the actuation ratio is greater than 1.5 when the chain guide is located in the first position; and
   wherein the actuation ratio is less than 3.5 when the chain guide is located in the first position.

2. The derailleur according to claim 1 wherein the actuation ratio is less than 1.0 when the chain guide is located in the second position.

3. The derailleur according to claim 1 wherein the chain guide is located closer to the base member when the chain guide is located in the first position than when the chain guide is located in the second position.

4. The derailleur according to claim 1 further comprising a biasing member that biases the chain guide towards the first position.

5. The derailleur according to claim 1 wherein the first sprocket is smaller than the second sprocket.

6. The derailleur according to claim 5 wherein the actuation mechanism comprises:
   a first link pivotably coupled to the base member and to the chain guide; and
   an actuating arm coupled to the first link for attaching a control cable.

7. The derailleur according to claim 6 wherein the first link is pivotably coupled to the base member at a first pivot location, wherein the first link is pivotably coupled to the chain guide at a second pivot location, and wherein the actuating arm extends in a direction opposite a straight path originating from the first pivot location and extending to the second pivot location.

8. The derailleur according to claim 7 wherein the actuation mechanism further comprises a second link that is pivotably coupled to the base member and to the chain guide, wherein the base member, the chain guide, the first link and the second link form a parallelogram linkage mechanism.

9. The derailleur according to claim 8 wherein the second link is located closer to the base member than the first link.

10. The derailleur according to claim 6 wherein the actuation mechanism includes a control cable route adjuster provided on the actuating arm for adjusting a route of the control cable.

11. The derailleur according to claim 10 wherein the control cable route adjuster comprises a diverting protrusion that rotates relative to the actuating arm between a rest position and an adjustment position.

12. The derailleur according to claim 11 wherein the control cable route adjuster allows the control cable to have a straight path in proximity to the control cable route adjuster when the diverting protrusion is in the rest position, and wherein the diverting protrusion bends the path of the control cable in proximity to the control cable route adjuster when the diverting protrusion is in the adjustment position.

13. The derailleur according to claim 12 wherein the control cable route adjuster further comprises a cable attachment portion for attaching the control cable to the actuating arm.

14. The derailleur according to claim 13 wherein a cable engagement location is disposed at the cable attachment portion when the diverting protrusion is in the rest position.

15. The derailleur according to claim 14 wherein the cable engagement location is disposed on the diverting protrusion when the diverting protrusion is in the adjustment position.

16. The derailleur according to claim 15 wherein the cable attachment portion comprises a generally annular member.

17. A front derailleur comprising:
    a base member structured to be attached to a bicycle frame member;
    a chain guide operatively connected to the base member; and
    an actuation mechanism coupled to the base member and to the chain guide for moving the chain guide relative to the base member;
    wherein the actuation mechanism comprises:
       a first link pivotably coupled to the base member and to the chain guide;
       wherein the first link is pivotably coupled to the base member for pivoting around an axis that extends through both the first link and the base member;
       an actuating arm coupled to the first link for attaching a control cable;
       wherein the actuating arm does not form part of the first link; and
       a control cable route adjuster provided on the actuating arm for adjusting a route of the control cable.

18. The derailleur according to claim 17 wherein the control cable route adjuster is disposed on a distal end portion of the actuating arm.

19. The derailleur according to claim 17 wherein the actuating arm extends from the first link.

20. The derailleur according to claim 19 wherein the actuating arm extends away from the first link.

21. The derailleur according to claim 19 wherein the actuating arm has a proximal portion coupled to the first link and a distal portion extending from the proximal portion and from the first link.

22. The derailleur according to claim 21 wherein the distal portion of the actuating arm forms a free end of the actuating arm, and further comprising a cable attachment disposed in close proximity to the free end.

23. The derailleur according to claim 17 wherein the axis that extends through both the first link and the base member is fixed relative to the base member.

24. A front derailleur comprising:
    a base member structured to be attached to a bicycle frame member;
    a chain guide operatively connected to the base member; and an actuation mechanism coupled to the base member and to the chain guide for moving the chain guide relative to the base member;
wherein the actuation mechanism comprises:
a first link pivotably coupled to the base member and to the chain guide;
an actuating arm coupled to the first link for attaching a control cable;
wherein the actuating arm does not form part of the first link; and
a control cable route adjuster provided on the actuating arm for adjusting a route of the control cable;
wherein the control cable route adjuster comprises a separate member that is movable relative to the actuating arm.

25. The derailleur according to claim 24 wherein the control cable route adjuster rotates relative to the actuating arm.

26. The derailleur according to claim 25 wherein the control cable route adjuster comprises a diverting protrusion that rotates relative to the actuating arm between a rest position and an adjustment position.

\* \* \* \* \*